June 9, 1936.  W. ROWLAND  2,043,710
PROCESS AND APPARATUS FOR STORAGE AND RECOVERY OF SOLUBLE MATERIALS
Filed July 3, 1933
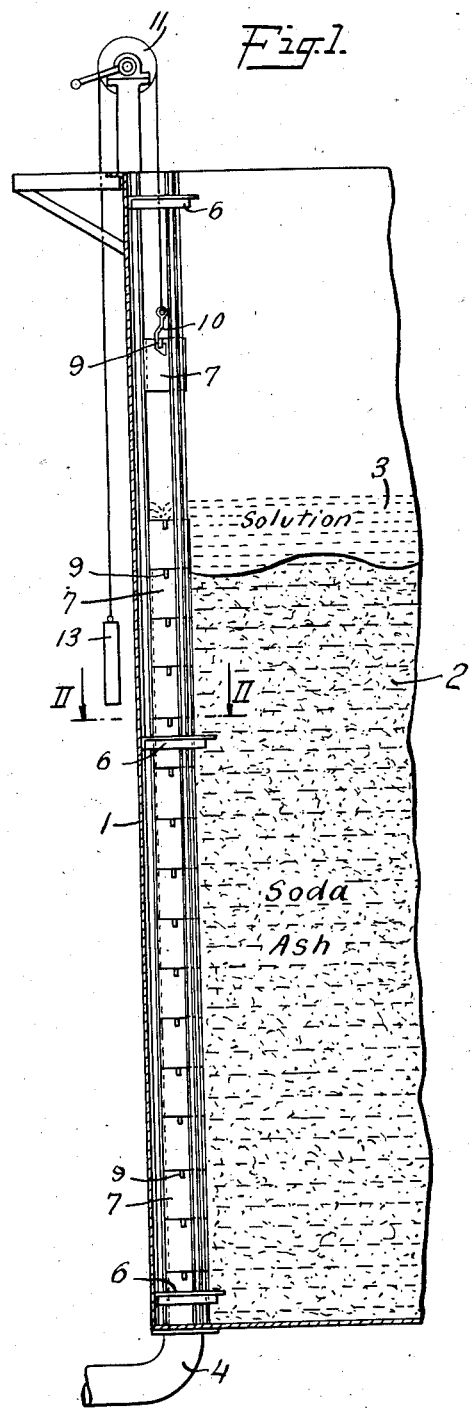
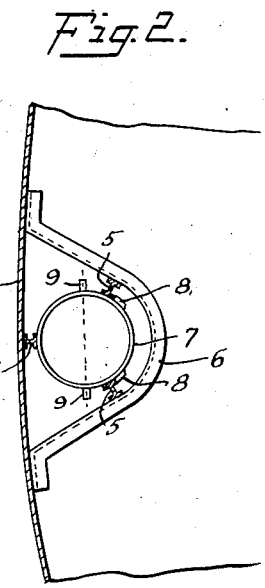
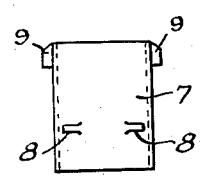
INVENTOR
Walter Rowland
BY
ATTORNEY Patented June 9, 1936

2,043,710

UNITED STATES PATENT OFFICE 2,043,710

PROCESS AND APPARATUS FOR STORAGE AND RECOVERY OF SOLUBLE MATERIALS

Walter Rowland, Prince George County, Va., assignor to Atmospheric Nitrogen Corporation, New York, N. Y., a corporation of New York Application July 3, 1933, Serial No. 678,999

3 Claims. (Cl. 23—268)

This invention relates to a method and apparatus for the storage and recovery therefrom of water soluble materials. More particularly, this invention relates to the storage and recovery from storage of water soluble materials such as soda ash which form with limited proportions of water a relatively solid cake.

In the copending application of William R. McCann, Serial No. 678,806, filed July 3, 1933, there is described a process for the storage of soda ash which involves mixing dry soda ash with water, introducing the mixture into a tank and forming in the tank a relatively hard cake of hydrated material.

It is an object of this invention to provide a method and apparatus for the storage of soda ash and like materials in the form of a relatively hard caked mass of hydrated material which facilitates the subsequent recovery from storage of the material in the form of a solution of the same.

The apparatus of this invention comprises a storage tank having a liquid outlet leading from the tank below the normal level to which the tank is filled with the material to be stored therein. The apparatus further comprises a plurality of pipe sections adapted to be fitted to the outlet of the tank and to one another to form a continuous conduit extending upwardly to a point above this outlet, which point may be varied to a desired level with respect to the contents of the tank by the addition to or subtraction from the conduit of one or more sections thereof.

The process of storing materials employing the novel apparatus of this invention comprises the steps of forming in a container an integral mass of solid material traversed by a conduit leading from a point above the upper level of the solid to and communicating with the outlet of the tank. In its preferred use, wherein the mass of solid material is formed by separation of solids from solution with withdrawal of solution from the tank for recirculation to carry into the tank additional quantities of solid, the process of this invention involves an intermittent lengthening of a conduit leading from the outlet of the tank to a point above the integral mass of solids therein but below the liquid level by adding sections to the conduit as the level of solid mass and water rises in the container.

The accompanying drawing illustrates one example of the apparatus of this invention. In the drawing Fig. 1 is a cross-section of a tank and a view of a sectional conduit embodying this invention. Fig. 2 is a cross-section of a portion of the tank wall and of the sectional conduit shown in Fig. 1 taken along the line II—II, and Fig. 3 is a view of one of the sections of the conduit shown in Fig. 2.

Referring to the drawing, numeral 1 designates a storage tank containing an integral mass of solid 2 with a supernatant layer of solution 3. The bottom of tank 3 is provided with a liquid outlet 4. Three guides 5 in the form of I-beams are supported in a vertical position extending from the bottom of tank 1 to above the level to which material is to be filled into the tank; one of them supported by the wall of tank 1 and the other two by straps 6 fastened to the wall of the tank. Guides 5 are spaced around the periphery of outlet 4 at such distances that cylindrical conduit sections 7 fit within the track formed by these guides and when lowered within the guides will be guided into position and held in superimposed relationship with the lowermost section centered over outlet 4. As shown in Fig. 2, sections 7 are provided with lugs 8 which co-act with guides 5 to prevent rotation of the sections while passing downwardly between the guides into position over outlet 4 or upon another section previously lowered into place so that, as shown in Fig. 1, opposed faces on the ends of the sections fit together to form a continuous conduit. Sections 7 are also provided with lugs 9 for engagement by a hook 10 shown in Fig. 1 by which a section may be lowered into place on one below or lifted therefrom as desired by means of a winch 11 over which a cable 12 carrying counterweight 13 runs.

In utilizing the apparatus shown in the drawing for the storage and recovery after storage of soda ash employing the process described in the aforementioned copending application, Serial No. 678,806 of William R. McCann, as soda ash and water are filled into tank 1 and a progressively increasing mass of solids forms in the tank, a section 7 is lowered into engagement with outlet 4 of the tank and additional sections added to maintain the top of the sectional conduit thus formed at a point above the upper level of the mass of solids but below the upper level of liquid in the tank. When it is desired to withdraw supernatant solution from the tank for recirculation to carry into the tank additional quantities of soda ash, this solution is withdrawn through the sectional conduit and outlet 4.

In recovering the soda ash from storage water is introduced into tank 1 to dissolve the solid and the resulting solution is withdrawn through the sectional conduit. As the level of the mass of solids is lowered by dissolution in the water, the upper section or sections of the conduit may be freed from solid which is caked on the conduit by projecting a flow of hot water against the caked solids adjacent to the conduit. The sections of conduit thus freed from solid cake may then be raised out of the tank by means of the hook, cable and winch shown in Fig. 1 so as to admit solution into the conduit at progressively lower levels as the level of the solid mass is lowered.

Numerous changes and modifications may be made in the particular apparatus illustrative of this invention which is described above without departing from the scope of the invention. The process and apparatus is further not limited to use for the storage of materials such as soda ash which form with water a solid cake of hydrated material, but are adapted for use in the storage of any soluble material and its recovery from storage in the form of an aqueous solution, as for example, the storage of common salt (sodium chloride), etc.

I claim:

1. The process for the storage of a material which comprises introducing a mixture of said material and water into a container in which an integral mass of solid forms and during the formation of said integral mass maintaining a passageway traversing said mass from an outlet positioned at the lower portion of the container to the upper surface of said mass.

2. The process for the recovery from storage of a solid material in the form of an integral mass occupying a container which comprises introducing water into contact with the upper surfaces of said material in the container to dissolve the material from the upper surface thereof, flowing the resulting solution downwardly through a conduit and progressively lowering the point of entry of said solution into the conduit as the level of the solid mass is lowered by solution of the solid in the water.

3. An apparatus for the storage of mixtures of a soluble material and water which comprises a tank, an integral mass of solid material within said tank, a liquid outlet communicating with the lower portion of the tank, a conduit communicating with said outlet and extending upwardly through the mass of material in the tank, said conduit comprising a plurality of superimposed separable sections having opposed fitting faces, each section resting on the one below and separable therefrom by being lifted, and an upwardly extending track in said tank within which the sections fit and by which they are guided into position one upon the other.

WALTER ROWLAND.